(12) United States Patent
Cote

(10) Patent No.: US 8,024,701 B2
(45) Date of Patent: Sep. 20, 2011

(54) VISUAL CREATION OF OBJECT/RELATIONAL CONSTRUCTS

(75) Inventor: Antoine Cote, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 972 days.

(21) Appl. No.: 11/691,928

(22) Filed: Mar. 27, 2007

(65) Prior Publication Data

US 2008/0244510 A1    Oct. 2, 2008

(51) Int. Cl.
*G06F 9/44* (2006.01)

(52) U.S. Cl. .................................... 717/106; 717/108

(58) Field of Classification Search ........... 717/106–109
See application file for complete search history.

(56) References Cited

U.S. PATENT DOCUMENTS

| | | |
|---|---|---|
| 5,159,687 A | 10/1992 | Richburg |
| 5,499,371 A | 3/1996 | Henninger et al. |
| 5,596,746 A | 1/1997 | Shen et al. |
| 5,659,723 A | 8/1997 | Dimitrios et al. |
| 5,797,137 A | 8/1998 | Golshani et al. |
| 5,893,108 A | 4/1999 | Srinivasan et al. |
| 5,913,063 A | 6/1999 | McGurrin et al. |
| 5,937,189 A | 8/1999 | Branson et al. |
| 5,937,409 A * | 8/1999 | Wetherbee ............. 1/1 |
| 6,163,776 A | 12/2000 | Periwal |
| 6,279,008 B1 | 8/2001 | Ng et al. |
| 6,343,265 B1 | 1/2002 | Glebov et al. |
| 6,360,223 B1 | 3/2002 | Ng et al. |
| 6,405,209 B2 | 6/2002 | Obendorf |
| 6,591,275 B1 | 7/2003 | Russell et al. |
| 6,609,133 B2 | 8/2003 | Ng et al. |
| 6,714,219 B2 | 3/2004 | Lindhorst et al. |
| 6,754,670 B1 | 6/2004 | Lindsay et al. |
| 6,789,252 B1 * | 9/2004 | Burke et al. ............. 717/100 |
| 7,080,361 B2 | 7/2006 | Aigen |
| 7,096,224 B2 | 8/2006 | Murthy et al. |
| 7,103,527 B2 | 9/2006 | Rajarajan et al. |
| 7,533,365 B1 * | 5/2009 | Hogstrom et al. ........... 717/105 |
| 2002/0091990 A1 * | 7/2002 | Little et al. ............. 717/105 |
| 2003/0058277 A1 * | 3/2003 | Bowman-Amuah .......... 345/765 |
| 2004/0049736 A1 | 3/2004 | Al-Azzawe et al. |
| 2004/0107183 A1 | 6/2004 | Mangan |
| 2004/0230555 A1 | 11/2004 | Phenix et al. |
| 2006/0074942 A1 | 4/2006 | Shaburov |

OTHER PUBLICATIONS

Charly Kleissner. Enterprise Objects Framework; A Second Generation Object-Relational Enabler. http://delivery.acm.org/10.1145/230000/223875/p455-kleissner.pdf key1=223875& key2= 8662 243 611 & coll=ACM&dl=ACM&CFID=15151515& CFTOKEN=6184618, SIGMOD, 1995, San Jose CA, last viewed Nov. 13, 2006, 5 pages.

Object Relational Mapping ER Diagram and Class Diagram Synchronization. Visual Paradigm Gallery, http://www.visual-paradigm.com/VPGallery/orm/ERDiagramAndClassDiagramSynchronization.html, last viewed Nov. 14, 2006, 2 pages.

Jeff Hanson. Simplify Java Object Persistence with Hibernate. DevX.com, http://www.devx.com/Java/Article/22652; Dec. 8, 2004, last viewed Nov. 14, 2006, 3 pages.

(Continued)

*Primary Examiner* — Anna Deng

(74) *Attorney, Agent, or Firm* — Workman Nydegger

(57) ABSTRACT

Visual controls such as drag and drop are utilized to create object-oriented constructs from corresponding relational constructs, for instance. Similarly, an object-relational map can be generated between the relational constructs and the created object-oriented constructs to facilitate interaction across disparate programmatic models.

18 Claims, 12 Drawing Sheets

OTHER PUBLICATIONS

Designing Data Model by Entity Relationship Diagram. http://www.visual-paradigm.com/edocs.jsp?url=content/product/dbva/dbva3DesignerGuide/pdf/dbva_designer_guide_chapter4.pdf&resourceType=document&resourceDetail=dbva3UserGuide. Last accessed Nov. 17, 2006.

Seth Grimes. Modeling Object/Relational Databases. DBMS, Apr. 1998. http://www.dbmsmag.com/9804d13.html. Last accessed Nov. 17, 2006.

Kari Alho. A design data manager. ACM, 1988. http://delivery.acm.org/10.1145/60000/50226/p202-alho.pdf?key1=50226&key2=1420673611&coll=ACM&dl=ACM&CFID=6365576&CFTOKEN=61458884. Last accessed Nov. 17, 2006.

Persistence® Edgextend™ for C++ Programming Guide. Version 8.0, Apr. 2003. Persistence Software Inc. http://www.progress.com/realtime/techsupport/documentation/edgextend_for_cplusplus/80/docs/programming.pdf. Last accessed Nov. 3, 2006.

Assisted SOA Development Research Report. The Middleware Company. Nov. 2004. http://xml.coverpages.org/OracleAssisted-SOA-Development.pdf. Last accessed Nov. 3, 2006.

Alister Jones. Implementing Raw Templating—Part 2. http://somenewkid.blogspot.com/2006_06_01_somenewkid_archive.html. Last accessed Nov. 3, 2006.

* cited by examiner

VISUAL CREATION OF OBJECT/RELATIONAL CONSTRUCTS

CROSS-REFERENCE TO RELATED APPLICATIONS

This application is related to U.S. patent application Ser. No. 11/669,966, filed Feb. 1, 2007 and entitled VISUAL ASSOCIATION CREATION FOR OBJECT RELATIONAL CLASS DEVELOPMENT and U.S. patent application Ser. No. 11/669,968 of even date and entitled VISUAL CONTROLS FOR STORED PROCEDURE AND OBJECT RELATIONAL CLASS DEVELOPMENT. The entireties of these applications are incorporated herein by reference.

BACKGROUND

Integrated development environments (IDEs) provide a common platform and design tools for modern software development. While software is often the most time-consuming and highest risk aspect of electronic program development, it also holds the greatest potential to enhance a design for multiple target applications. Such design tools allow designers to efficiently develop code where graphical user interfaces (GUI) automate and simplify configuration of complex programming projects. These tools also enable designers to create source code by enhancing code readability and simplifying code writing. For instance, source code editor features may include syntax coloring, auto-indenting and shortcut menus that link stored procedure calls to their definitions, declarations and usages even when these references reside in separate files. Other aspects of the tools include simulation resources to allow designers to develop and debug applications.

One area of software development that is performed on IDEs includes mapping class objects to relational objects, referred to as O/R mapping, and is the latest advancement in modern day programming technologies. It improves productivity of programmers by many degrees while providing flexibility to adapt to changing business needs. While O/R technology itself provides many benefits to programmers, enabling O/R classes to be created and set up correctly is not an easy task for normal development nor is it well supported in current programming tools. Without providing adequate tools support, programmers trying to adopt the technology may be forced to write their respective code manually.

One purpose driving O/R technologies is the need to interface the relational database world with the models supported in the object oriented programming world. For example, relational database management systems (RDBMS) supporting a relational database pre-dated the popularization of object-oriented programming in the 1990s. Using relational databases to store object-oriented data leads to a semantic gap where programmers would be required to allow their software to function in two different worlds—processing of data would be performed in object-oriented form, but the same data would have to be stored in relational form.

Requiring this constant conversion between two different forms of the same data not only had the effect of stifling performance but also imposed difficulties for programmers as relational or object-oriented forms would impose limitations on each other. For example, relational databases make complicated associations difficult, and they tend to "map" poorly into the object-oriented world since they fail to implement the relational model's user-defined types. This problem is sometimes referred to as the Object-Relational impedance mismatch.

Generally, relational databases use a series of tables representing simple data, where optional or related information is stored in other tables. A single (persistent object) record in the database often spans several of these tables, and requires a join to collect all of the related information back into a single piece of data for processing. This would be the case for an address book example, which would likely include at least a user and address table, but perhaps even a phone number table as well. In the object world, there is a clear sense of "ownership," where a particular person object owns a particular phone number in the above example. This is not the case in relational databases, where the tables have no understanding how they relate to other tables at a fundamental level. Instead, the user must construct a "query" to gather information together. Queries not only request what information to return but also need to know how the tables involved are related to each other, illustrating the point that tables do not know their relationships when they are residing in the database. Thus, these relationships are typically only known when a query is run to specify the relationships. Relational databases (which attempt to implement the Relational Model), do maintain relationships via constraints but the Structured Query Language (SQL), for example, is generally unaware of these.

When creating Object/Relational (O/R) classes by mapping class objects to database objects, it is important to also set correct associations between related objects so that applications written on top of these objects can easily take advantage of such relationships. Hand coding such relationship is not a trivial task for typical developers. While the O/R technology itself provides many benefits to programmers, manually having O/R classes created and set up correctly is not a straightforward or simple task. With current development tools support, programmers trying to adopt O/R technology are often forced to write code manually which detracts from the utility of such tools.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to a development system or designer to facilitate construct creation and mapping. More particularly, visual controls can be employed to facilitate automatic generation of an object-oriented construct and/or associated object/relational mapping. Mechanisms are provided that enable programmers to visually map relational constructs and object oriented constructs by depositing a relational construct onto a workspace or design surface. Code generation is done transparently behind the scenes to limit or eliminate manual coding. This simplifies O/R programming and encourages adoption of the technology.

In accordance with an aspect of the disclosure, a development system is provided. The system includes an interface component to receive or otherwise identify select constructs and a creation component that creates or defines a corresponding structure. Automated creation of an object-oriented structure, for instance, is initiated by selection of a relational construct and adding it a workspace or designer.

According to another aspect of the disclosure, the development system includes a mapping component coupled to the interface and creation components. The mapping component generates a map between a select construct and a created construct such as an object/relational mapping between a relational and object-oriented construct. This mapping facilitates interaction amongst disparate data models. Similar to the creation component, the mapping component can also be visually initiated by dropping a construct on a workspace.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Systems and methods are provided to facilitate program development. Visual mechanisms can be employed to initiate automatic generation of constructs of a first type from constructs of a second type. For example, relational constructs such as databases, tables and the like can be dragged and dropped upon a design surface or workspace to initiate generation of corresponding object-oriented constructs. Furthermore, a map can be created to facilitate interaction amongst constructs of disparate programmatic models such as those associated with relational and object-oriented programming.

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
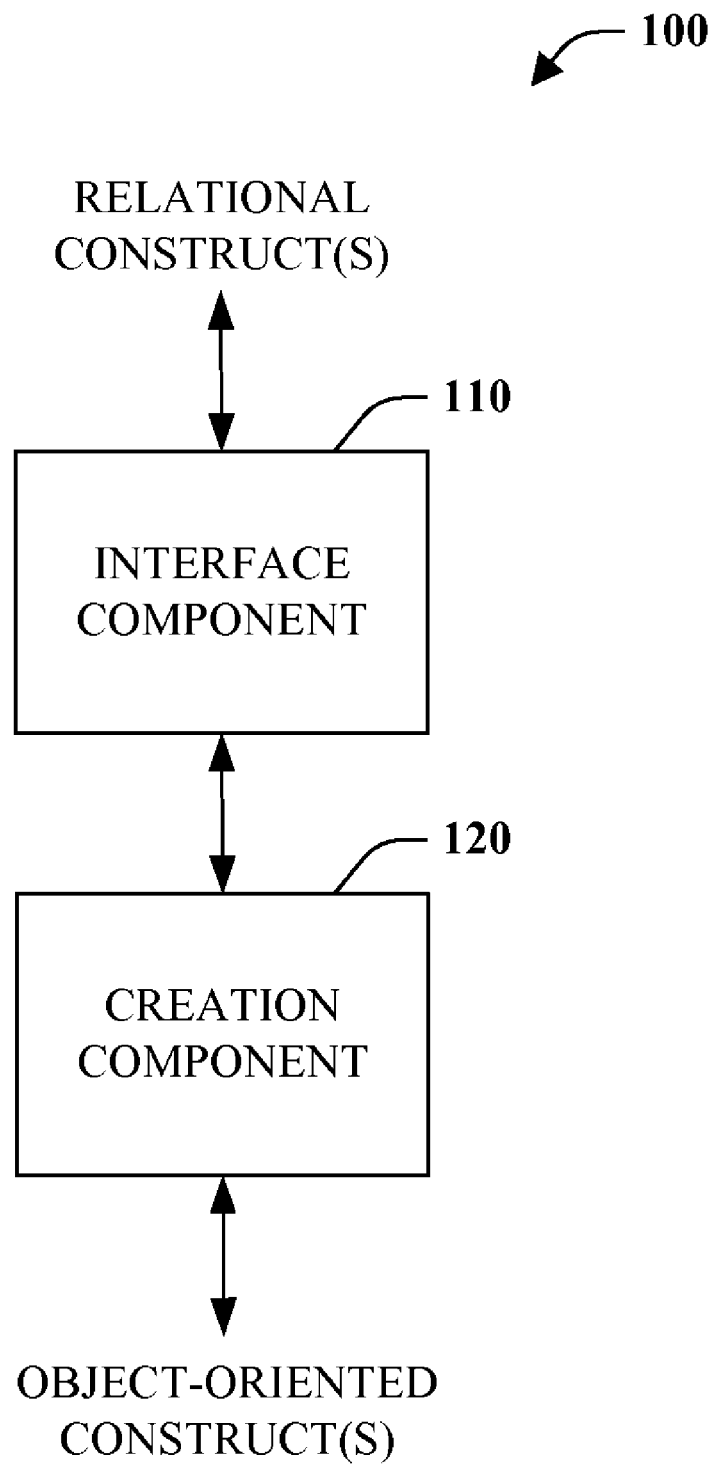
FIG. 1 is a block diagram of a construct development system.

Referring initially to FIG. 1, a construct development system 100 is illustrated in accordance with an aspect of this disclosure. The system 100 is operable to create constructs of a first type from a construct of a second type automatically. In one instance, such functionality can be employed with respect to generation of object-oriented constructs from corresponding relational constructs. This is quite useful as conventionally object-oriented constructs and associated mappings are handwritten with little if any help from a development environment, which is not a simple task for average programmers. Among other things, the functionality associated with the development system 100 can be embodied as a component of an integrated development environment (IDE), as an application-programming interface (API) or the like.

The development system 100 includes an interface component 110 that receives relational constructs or identification thereof. As will be described further infra, receipt of these constructs can be provided via deposit of the constructs or a representation thereof onto a design surface or workspace. Examples of relational constructs or more generally database constructs that can be received by the interface component 110 are databases, tables, stored procedures, table value functions and views, among other things. The interface component 110 is communicatively coupled to creation component 120 to enable provisioning of constructs.

The creation component 120 receives, retrieves or otherwise acquires one or more constructs obtained by the receiver component 110 and generates a corresponding construct or constructs. In particular, the creation component 120 can create an object-oriented construct from an identified relational construct or vice versa. For example, if the relational construct is a table, the creation component 120 can generate a class of the same or similar name including column names as class properties. In one instance, the creation component 120 can acquire information about an identified relational construct from a context file associated therewith and utilize this information to create the corresponding object-oriented structure.

The creation component 120 can also perform analysis on a provided or identified construct to determine an appropriate matching construct. Accordingly, the component 120 need not simply utilize a predetermined one-to-one mapping. By way of example, consider identification of a database with two columns is identified such as a lookup table. Rather than creating a class with two properties corresponding to an id and another column name, the creation component 120 can recognize that this structure resembles a simple dictionary table and choose to create an enumeration.

It should be appreciated that the development system 100 is quite flexible in creation of corresponding constructs. While an entire database can be placed on a workspace and subject to generation of one or more corresponding constructs, this is not required. The development system 100 can be much more granular and allow users to pick and choose constructs with which they desire to work. Among other things, this enables development flexibility and efficiency since an entire database need not be subject to mapping but rather only those constructs needed.

Figure 2:
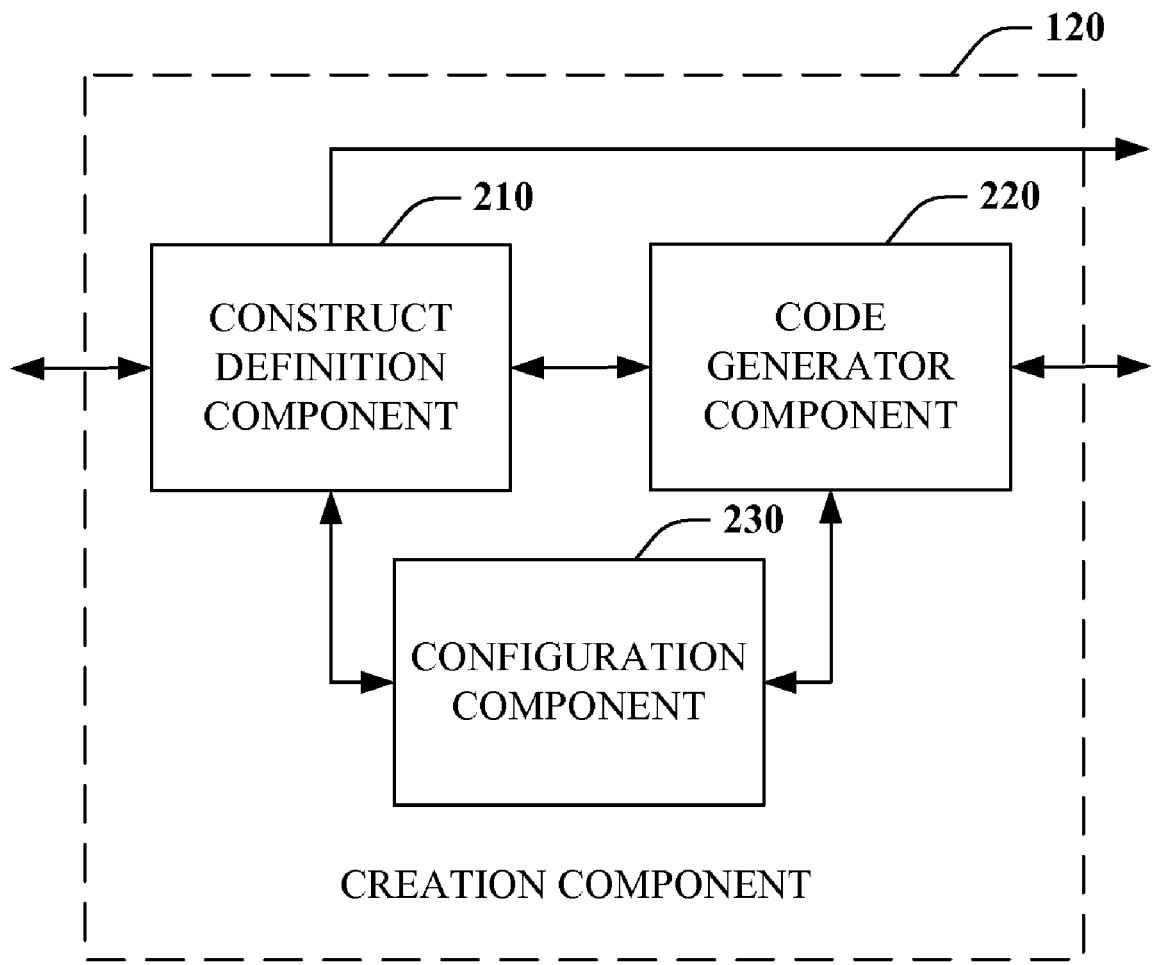
FIG. 2 is a block diagram of a representative creation component.

Referring to FIG. 2, a representative creation component 120 is illustrated to facilitate description of additional functionality. The creation component 120 can include a construct definition component 210 and a code generation component 220. The construct definition component 210 can produce definitions of created structures such as class definitions including properties and methods. These definitions can be defined independent of a particular language implementation, for instance as an XML (eXtended Markup Language) document. Accordingly, as relational constructs are received, such a document can be updated to include created object-oriented constructs. This definition can be employed by the code generator component 220 to generate target language code for example in C#, Visual Basic or Java, among others. For example, upon initiating a save of the created constructs the code generator component 210 can be invoked to translate the constructs into a designated programming language. Accordingly, the creation component 120 can output a target language independent or internal representation of created constructs and/or a language specific representation.

The creation component 120 can also include a configuration component 230 to facilitate language translation. For example, since relational databases tables tend to be defined as plural entities, the configuration component 230 can singularize table names or alternatively pluralize singular names where needed. For instance, a table entitled "customers" can be converted to a singular "customer" class. The configuration component 230 can aid such transformation with the help of a dictionary or the like. Furthermore, such transformations can occur in any language.

Additionally, the configuration component 230 can assist in converting types specific to databases to known language types. By way of example, the SQL "varchar" database type can be converted to a string for a target language such C# or Visual Basic. Still further yet, the configuration component 230 can aid in generation of valid names for particular languages, as databases sometimes allow characters that are not valid. For instance, if a name has a space, the configuration component 230 can replace the space with an underscore character where necessary.

Figure 3:
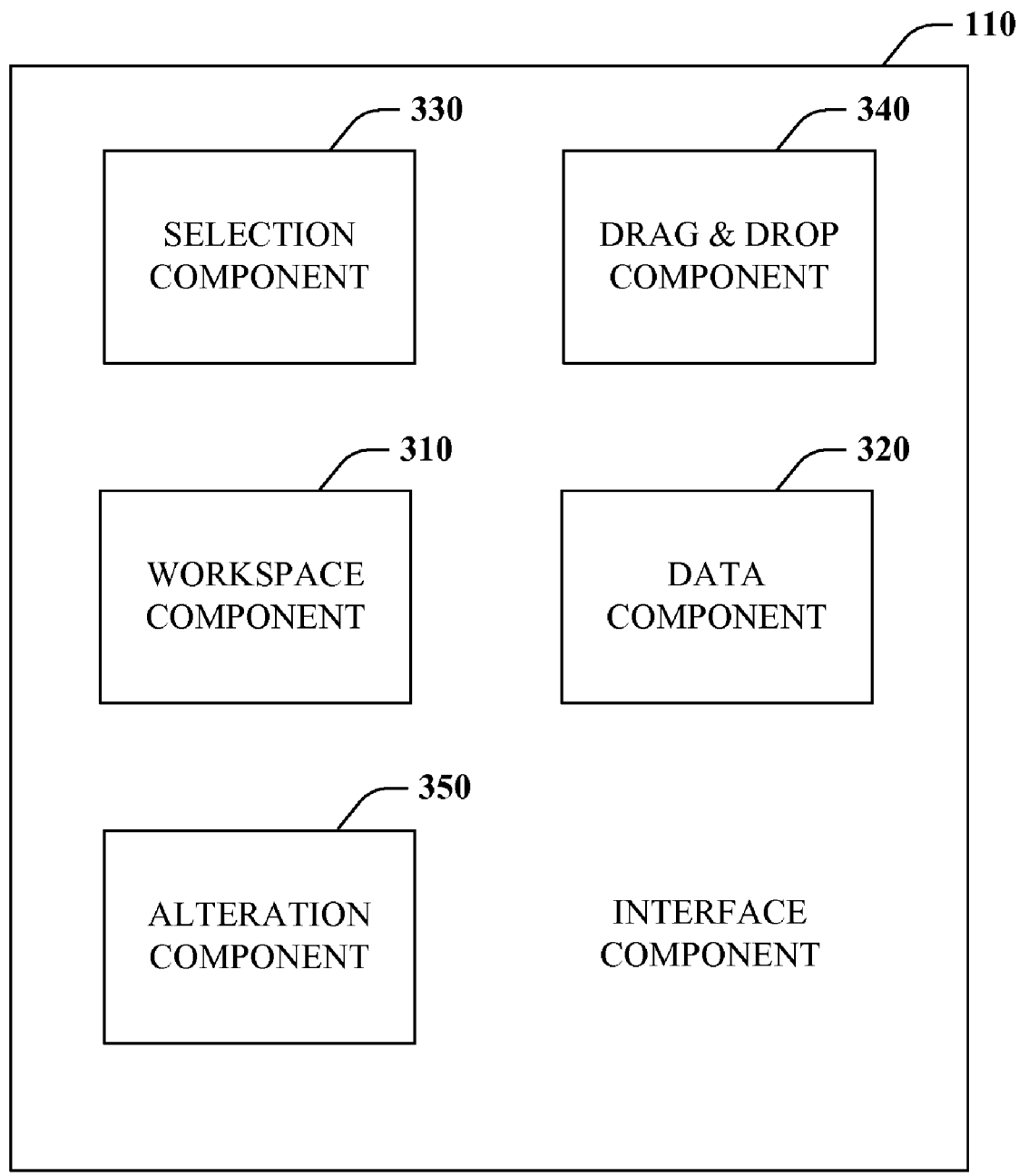
FIG. 3 is a block diagram of a representative interface component.

Turning to FIG. 3, a representative interface component 110 is provided in accordance with an aspect of the claimed subject matter. As previously described, the interface component 110 can receive relational constructs to facilitate creation of corresponding object-oriented constructs, among other things. In one instance, the interface component 110 can form part of and/or interact with an integrated development environment.

The interface component 110 can include a workspace component 310 that affords a graphical region for designing programs or portions thereof In other words, elements of a program, API, library or the like can be visually and/or graphically compiled on the workspace to facilitate development. Also included is a data component 320. The data component 320 identifies one or more available data sources such as databases, tables and associated structures and/or methods. These sources can be displayed in an organized fashion with associated text and/or icons to aid identification thereof. In this manner, the data component 310 provides an explorer of one or more databases and/or elements thereof.

Selection component 330 and drag and drop component 340 provide mechanisms for interacting with a workspace and/or displayed data. More particularly, the selection component 330 enables data to be selected for example via point and click, voice recognition and/or other gesturing. In this manner, a data element of interest can be identified. The drag and drop component 340 enables a selected item or copy thereof (or identifying information) to be deposited onto the workspace. This enables the selected item to be added to a program, project or the like. By way of example, a database table can be selected and subsequently dragged and dropped onto the workspace. Alternatively, the same table may be added to the workspace by alternative means including without limitation via a command to add the table to the workspace.

Alteration component 350 enables a user to edit a workspace item or representation thereof. For example, a user can change attributes associated with an item such as the item's name or type. This can be accomplished through a separate interface window and/or directly on the item in workspace. Additionally or alternatively, the alteration component 350 enables items on a workspace to be related or associated. In this manner, the alteration component 350 allows a user to customize workspace items and facilitate program design.

Figure 4:
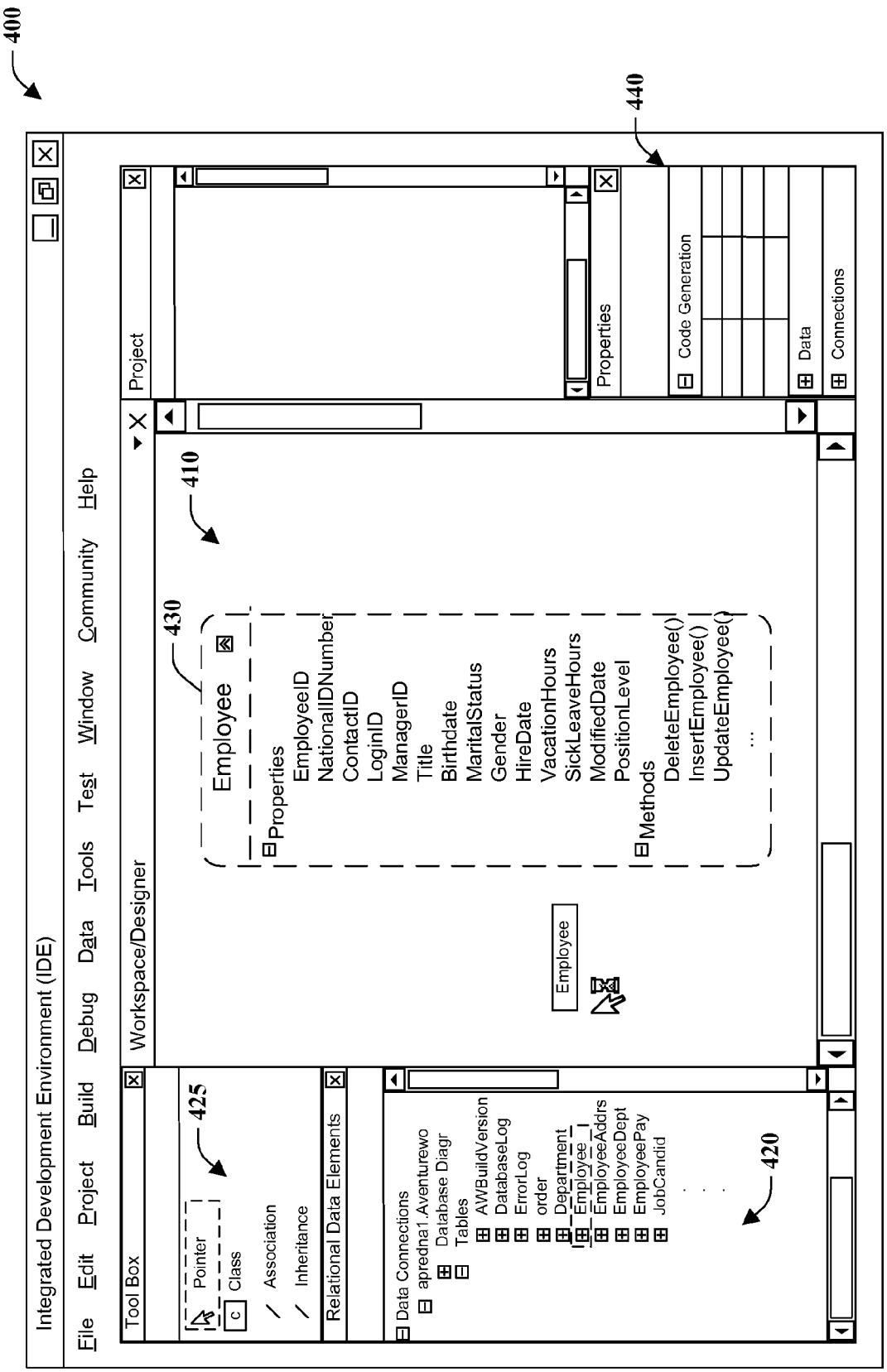
FIG. 4 is a screenshot of an exemplary development system for generating an object-oriented construct.
Figure 5:
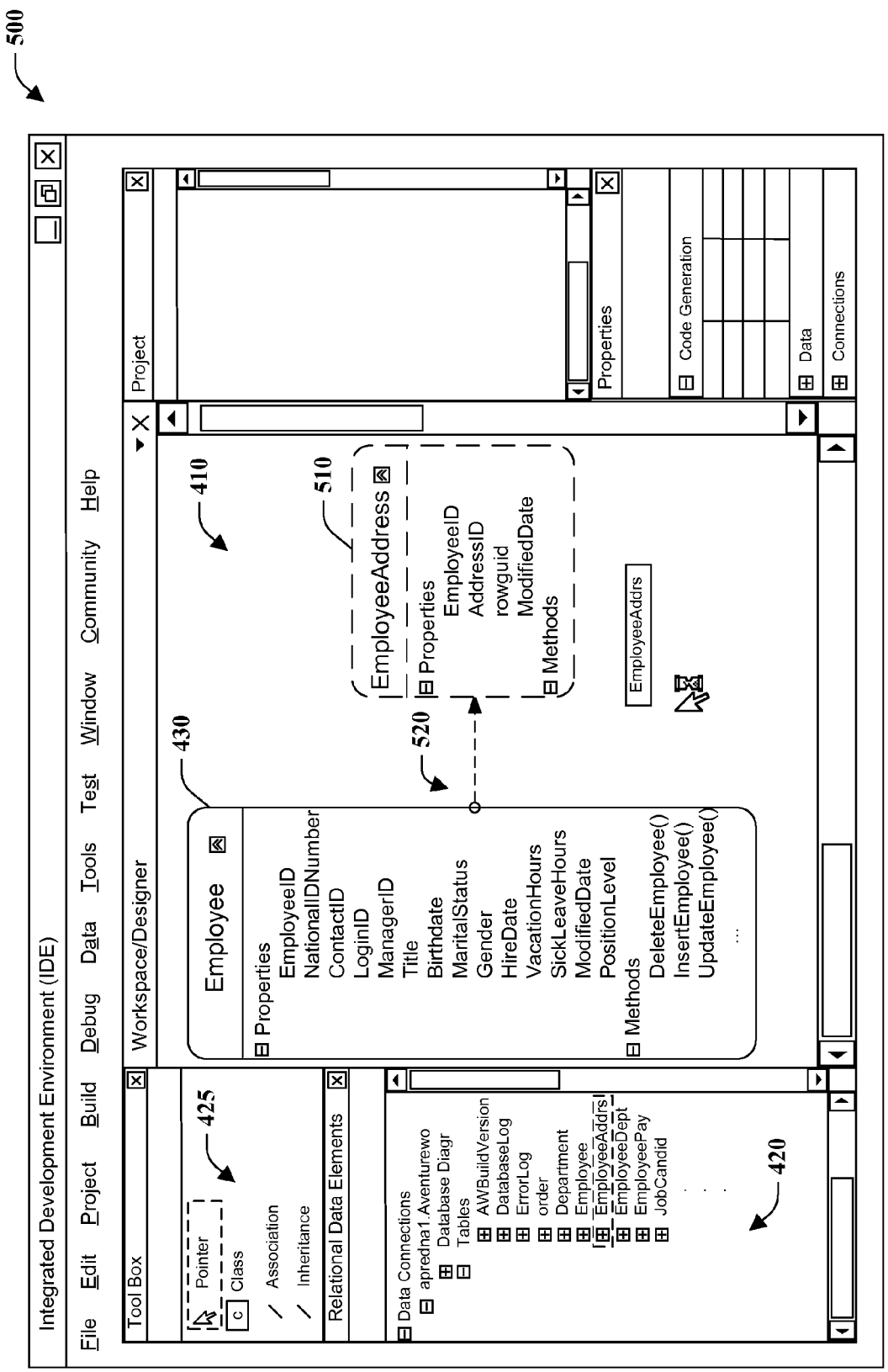
FIG. 5 is a screenshot of an exemplary development system for associating object-oriented constructs.

FIGS. 4 and 5 provide two exemplary screenshots 400 and 500 of development systems or environments to facilitate clarity and understanding with respect to aspects of this disclosure. It is to be appreciated that these screenshots represent only one of a myriad of manners in which graphics, text and the like can be combined, presented and/or interacted with to aid program design. Accordingly, the claimed subject matter is not to be limited thereto.

Turning first to FIG. 4, screenshot 400 illustrates an exemplary integrated development environment. Included therein is a workspace/designer 410 onto which programmatic items can be placed and/or interacted with to generate a program, application programming interface, library or the like. The environment also includes a windowpane 420 for display of data items or elements. In this instance, a data hierarchical structure is shown with text and mechanisms to expand and collapse items to aid structure navigation. Also provided is a tool bar windowpane 425 for selection of an interface mechanism. Here, a pointer is identified as the selection mechanism.

In accordance with an aspect of the claimed subject matter, a database construct can be selected from the data pane 420 and dragged on dropped onto the workspace 410. In this case, the database table "employee" is selected and deposited onto the workspace 410. Here, that is denoted by the dashed line box around "employee" and the tool tip by the same name indicated it is being dragged onto the workspace 410. This action can initiate creation of an object-oriented construct that corresponds to the "employee" table rather than simply placing a copy of the table thereon. As shown, a class "employee" 430 is created automatically from the employee table and presented to a user. Each table column name is translated into a class property and class methods are also created to facilitate interaction with class data (e.g., store, retrieve, update, delete . . . ).

Once generated, users can alter the class in a number of ways. For example, property windowpane 440 can be utilized to alter property names, values and/or types among other things. Further, yet, a user way simply select and modify the class 430 directly in the workspace 410. For example, the property "HireDate" could be renamed "StartDate" among other things.

Screenshot 500 of FIG. 5 illustrates the addition of another element to the workspace 410. In particular, an employee address table is selected and added to the workspace 410. A corresponding class named "employee" 510 is generated upon the addition including one or more properties and methods. It can also be noted that it that the employee class 430 is related to the employee address class 510 perhaps by associated keys (e.g., primary, foreign). This relationship or association can then be captured and is represented graphically by the arrow 520 connecting the classes 430 and 510. This can be done automatically and/or manually. It is important to set correct associations between related objects so that applications written on top of these objects can easily take advantage of such relationships.

Figure 6:
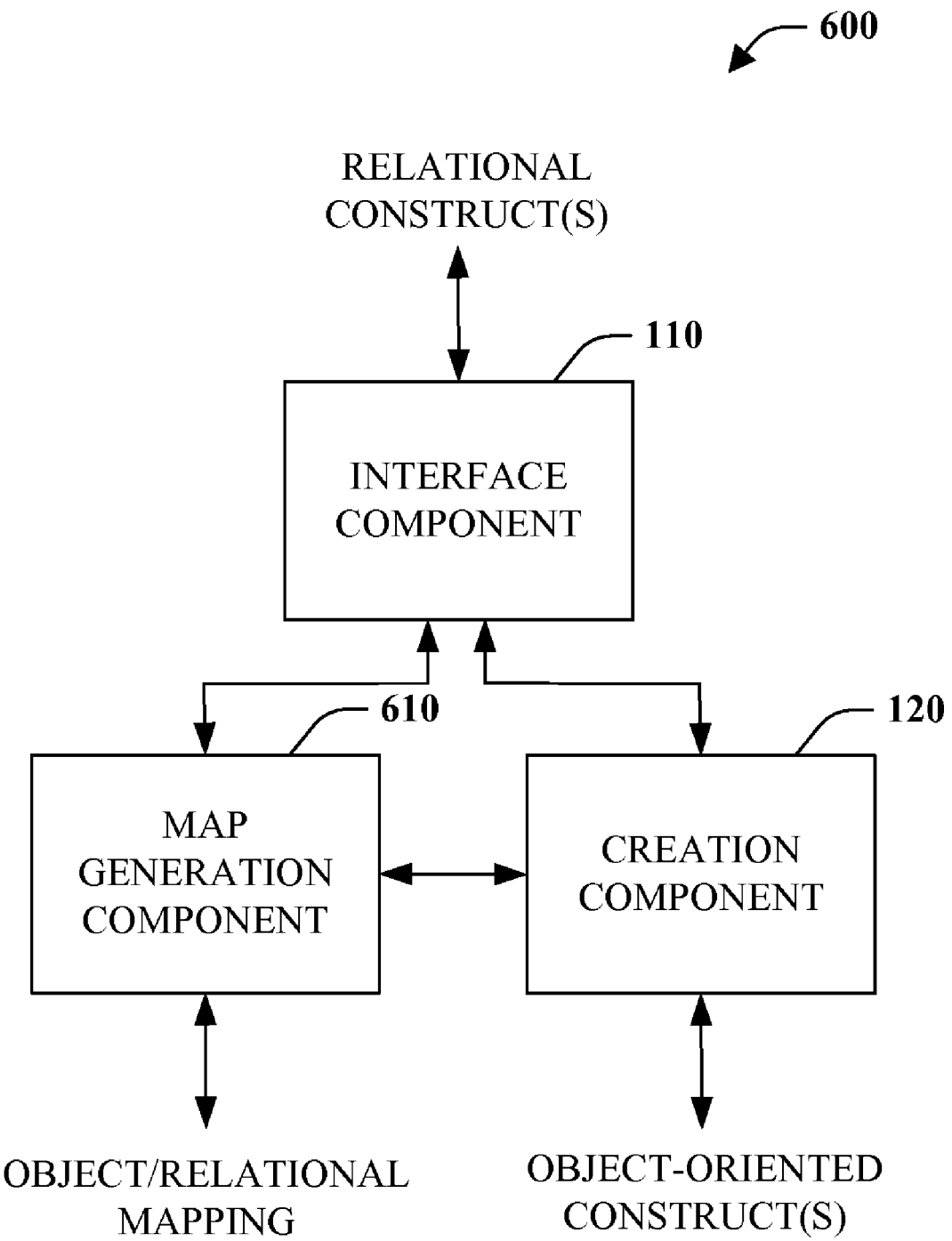
FIG. 6 is a block diagram of a development system with mapping functionality.

Referring to FIG. 6, a development system 600 is depicted in accordance with an aspect of the claimed subject matter. Similar to system 100 of FIG. 6, system 600 includes the interface component 110 and creation component 120, as described supra. In brief, the interface component 110 receives a construct such as a relational construct and the creation component acquires this construct and generates a corresponding construct such as an object-oriented construct.

Hence, a database schema can be translated to a program language schema. In addition to creating a corresponding construct, a map between constructs can be created by map generation component 610. The map generation component 610 can acquire a first construct from the receiver component 110 and a generated, corresponding construct from creation component 120 and generate a map between the constructs.

The map can facilitate interaction between the constructs. In one instance, the map can be an object/relational mapping. In this manner, an object model can be mapped to the relational model to enable object model data to be persisted to and/or retrieved from a relational model or vice versa. By way of example, the mapping may map a class method to a SQL language implementation and/or a SQL language implementation to a class method. The impedance mismatch can thus be bridged by the generated map.

Figure 7:
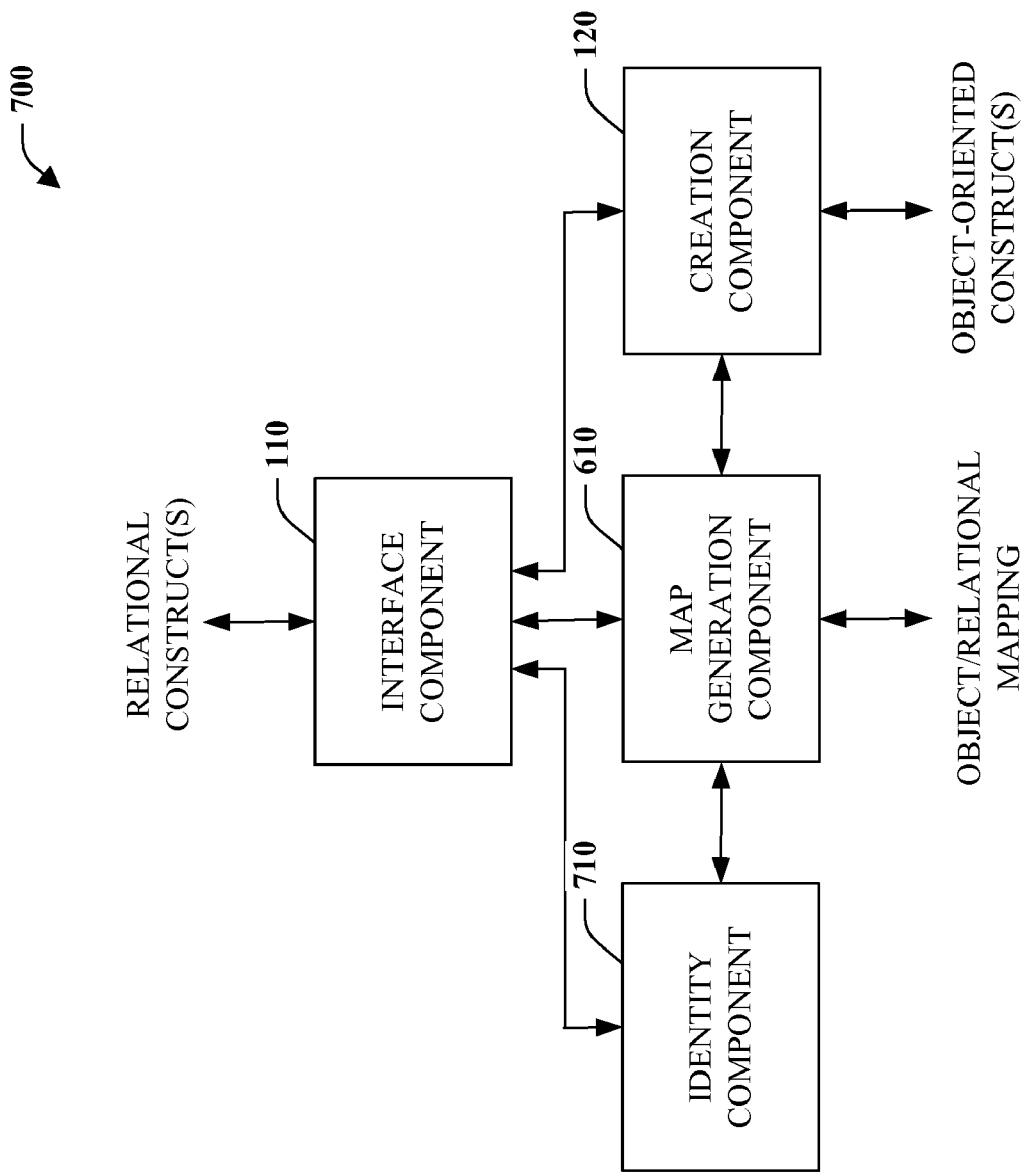
FIG. 7 is a block diagram of a development system with mapping functionality for existing constructs.

FIG. 7 depicts a development system 700 in accordance with an aspect of the claimed subject matter. System 700 includes the components of system 600 including the interface component 110, the creation component and the map generation component 610. These components enable generation of a construct from a corresponding construct and a map. In one instance, an object-oriented construct can be generated from a relational construct and an object/relational mapping produced. However, a map need not be generated from a newly constructed construct output by the creation component 120.

Constructs can be preexisting and/or generated by hand alone or in combination with help from design tools. System 700 includes an identifier component 710 that identifies or discovers such preexisting and/or alternately generated constructs and provides them to the map component 610 for generation of an appropriate map or mapping.

By way of example and not limitation, a user can hand code a class corresponding to a relational database table. Subsequently, the same user can drag and drop the table into a workspace. The identify component 710 can acquire the table, identify the associated class and cause the object/relational mapping to be generated by the map component 610. Similarly, if there is a pre-existing mapped class and the underlying database schema changes, a user could drag and drop the table over the class and the class and/or mapping can be updated/refreshed base on the new database schema.

As a result, the development system 700 is flexible with respect to construct and map generation. In one instance, corresponding constructs and associated maps can be created automatically by the system for an identified construct. Additionally or alternatively, related constructs can be constructed by hand or other conventional mechanism and a mapping generated automatically. All such functionality can be implemented in a visual fashion to facilitate easy specification via a mechanism like drag and drop.

The aforementioned systems, architectures and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. For example, the configuration component 230 and/or associated functionality can be included within one or both of the construct definition component 210 and the code generator component 220. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the creation component 120 can employ such mechanisms select and construct construction of an appropriate construct. Similarly, the mapping component 610 can utilize these mechanisms to infer maps between constructs given a particular context.

Figure 8:
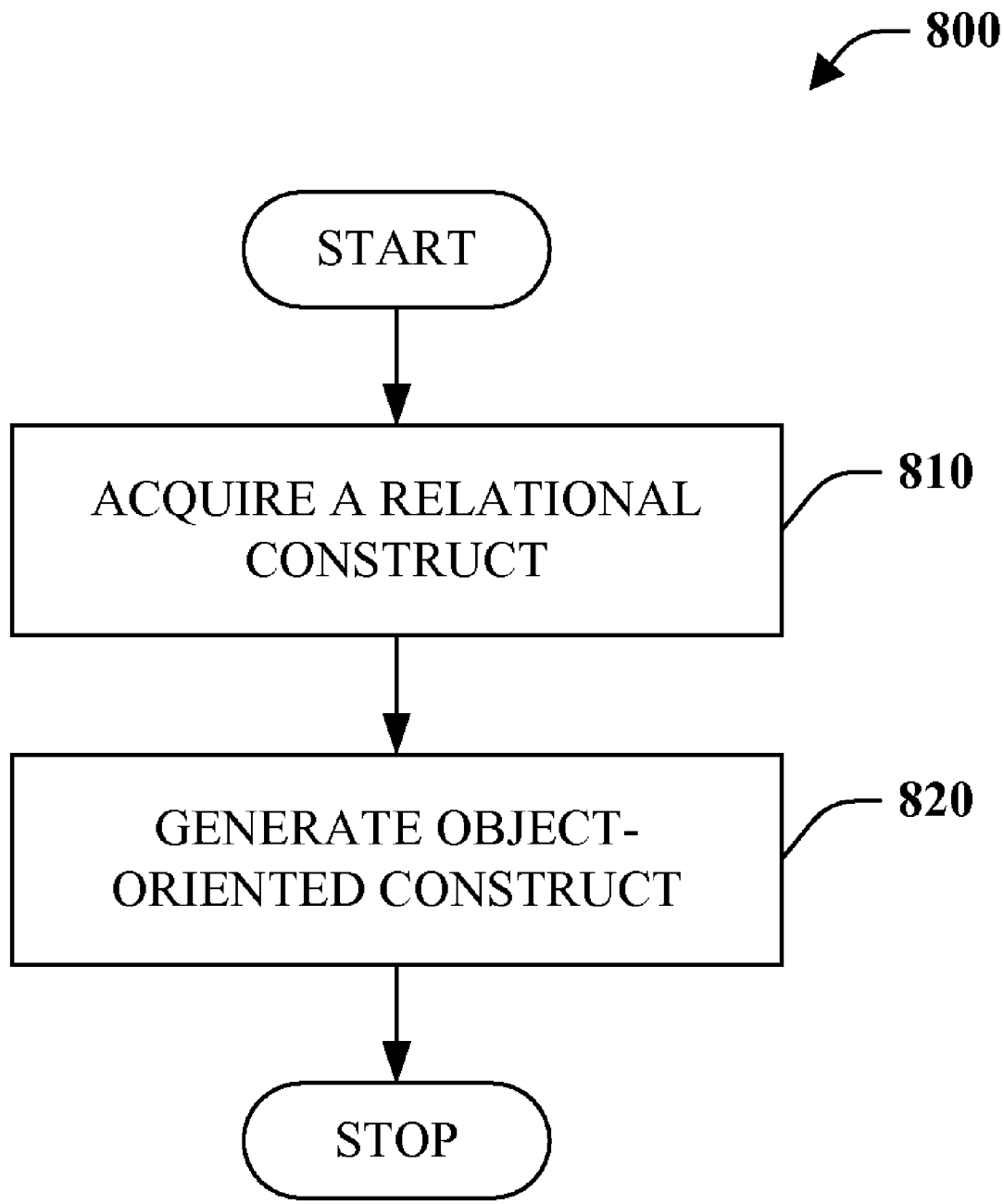
FIG. 8 is a flow chart diagram of a construct creation method.
Figure 9:
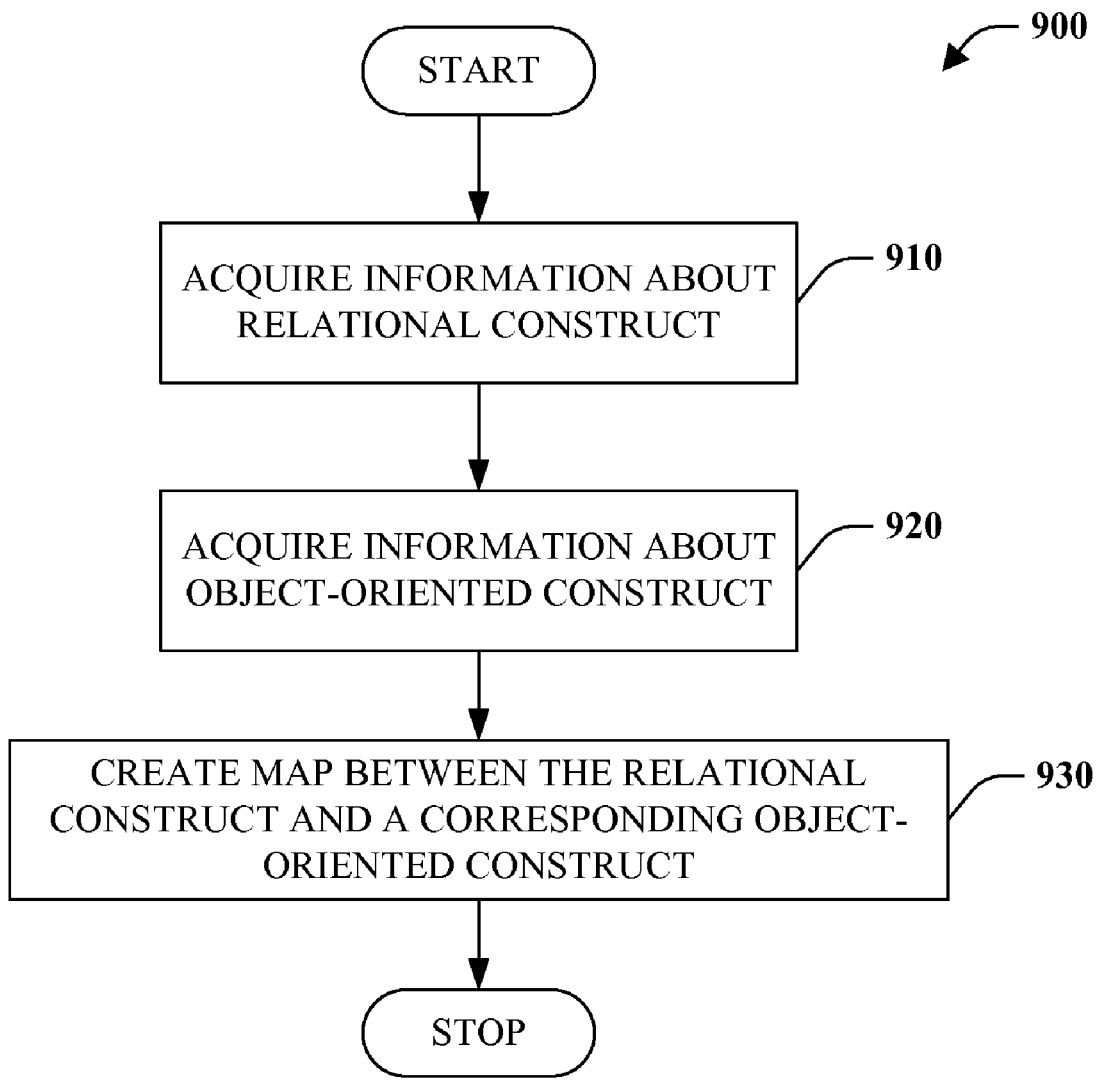
FIG. 9 is a flow chart diagram of a map generation method.
Figure 10:
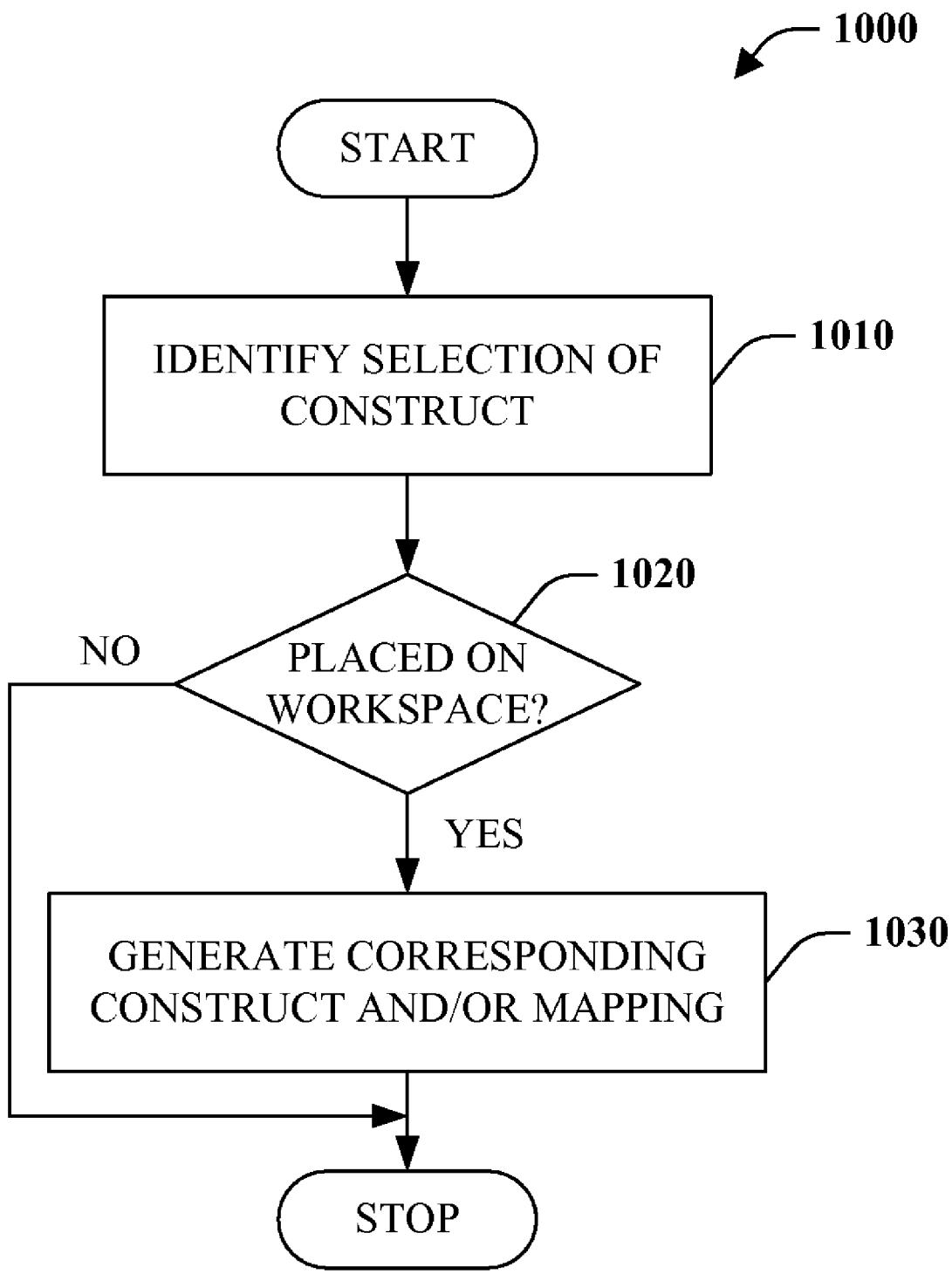
FIG. 10 is a flow chart diagram of a method for initiating construct and/or map creation.

In view of the exemplary systems described supra, methodologies that may be implemented in accordance with the disclosed subject matter will be better appreciated with reference to the flow charts of FIGS. 8-10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Referring to FIG. 8, construct creation method 800 is illustrated in accordance with an aspect of the claimed subject matter. In one instance, method 800 can be employed by an integrated development environment to assist program development. At reference numeral 810, a construct is acquired. For example, a relational construct such as a database, table, store procedure, view can be received or otherwise identified. At numeral 820, a corresponding construct is created for the acquired construct. In once instance, an object oriented construct is created that corresponds or maps to a received relational construct. It should be appreciated that the created construct can be a definition of the construct for example in an XML document. The actual construct can subsequently be generated in a target programming language utilizing the generated definition.

FIG. 9 a map generation method 900 is illustrated in accordance with an aspect of the disclosure. A map such as an object/relational mapping can facilitate transparent interaction with disparate systems. At reference numeral 910, information about a relational construct is acquired. Such information can be obtained from the construct itself and/or associated metadata. Information about a corresponding object-oriented construct is acquired at numeral 910. The object-oriented construct can be an automatically generated construct or a manually specified construct, among other things. At reference 930, a map is created between the relational construct and the corresponding object-oriented construct thereby producing an object/relational mapping. This map can act as a broker between the relational world and the object world.

FIG. 10 is a flow chart diagram of a method 1000 of initiating creation of constructs and/or maps in accordance with an aspect of this disclosure. At reference numeral 1010, selection of a construct such as a database object or relational construct is detected. Selection can correspond to highlighting or clicking on an object or construct. At numeral 1020, a check is made to determine if the selected item has been added to a workspace or design area, for example via a drag and drop. If the selected item has not been added to a workspace, then the method 1000 can simply terminate. Alternatively, if the item was deposited on the workspace, then the method continues at reference 1030. Here, a corresponding construct and/or map are generated. By way of example, a database can be selected and dropped onto a workspace. As a result, one or more classes or other object constructs can be generated that represent the database schema in a language schema. Accordingly, a drag and drop to a workspace will not place an exact copy of a selected item thereon, but rather an alternative representation thereof.

As used herein, the terms "component," "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Furthermore, examples are provided solely for purposes of clarity and understanding and are not meant to limit the subject innovation or relevant portion thereof in any manner. It is to be appreciated that a myriad of additional or alternate examples could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject innovation.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 11:
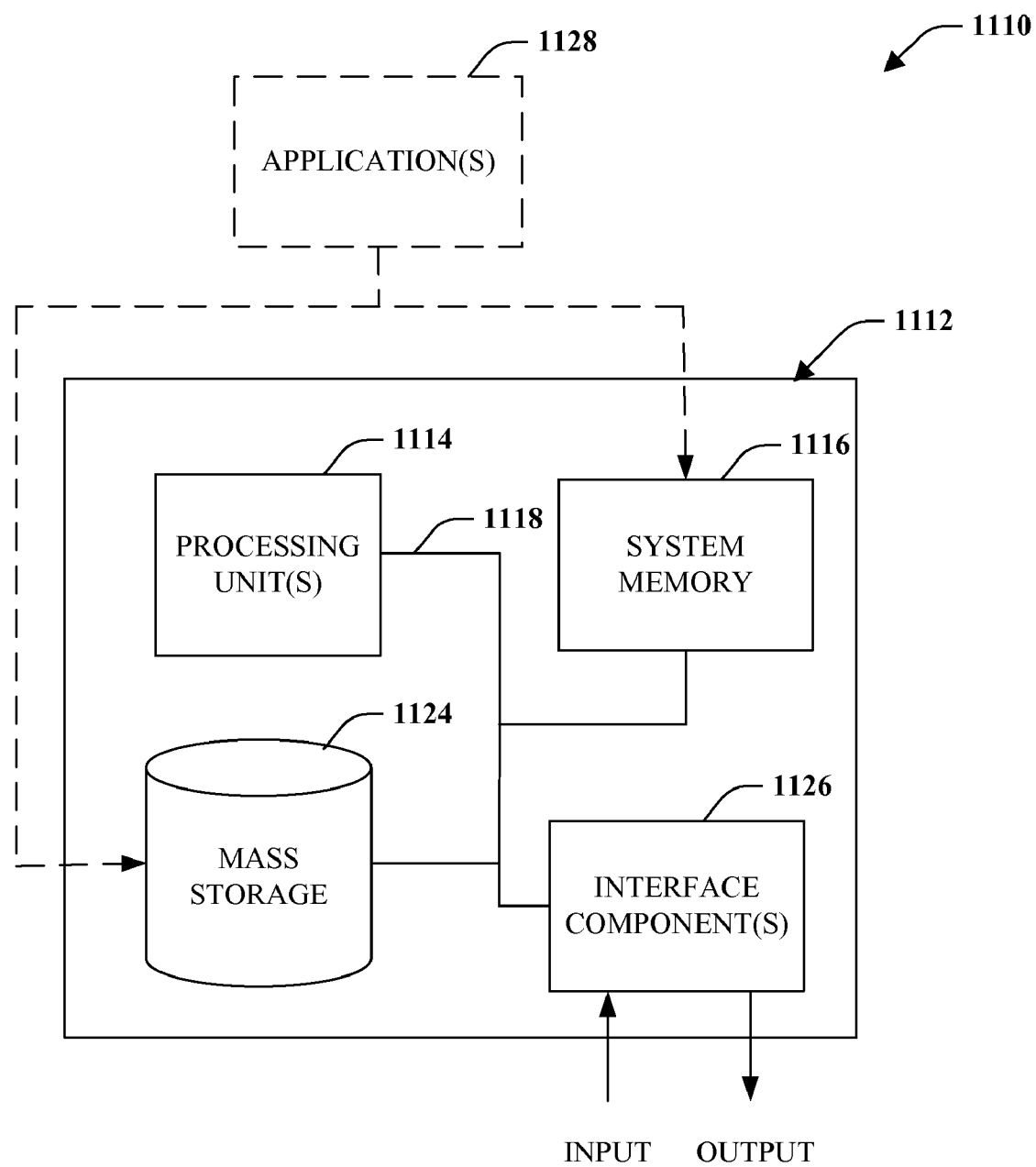
FIG. 11 is a schematic block diagram illustrating a suitable operating environment for aspects of the subject disclosure.
Figure 12:
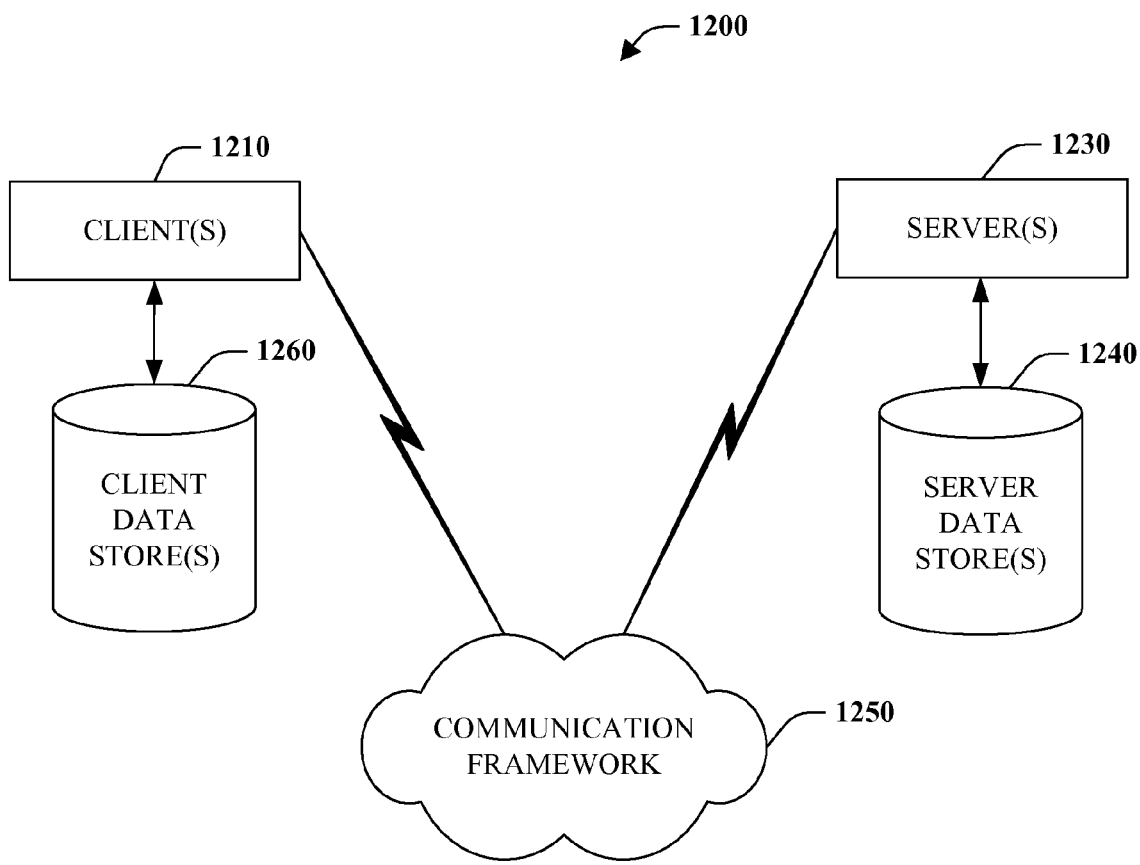
FIG. 12 is a schematic block diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 11, an exemplary environment 1110 for implementing various aspects disclosed herein includes a computer 1112 (e.g., desktop, laptop, server, hand held, programmable consumer or industrial electronics . . . ). The computer 1112 includes a processing unit 1114, a system memory 1116 and a system bus 1118. The system bus 1118 couples system components including, but not limited to, the system memory 1116 to the processing unit 1114. The processing unit 1114 can be any of various available microprocessors. It is to be appreciated that dual microprocessors, multi-core and other multiprocessor architectures can be employed as the processing unit 1114.

The system memory 1116 includes volatile and nonvolatile memory. The basic input/output system (BIOS), containing the basic routines to transfer information between elements within the computer 1112, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 1112 also includes removable/non-removable, volatile/non-volatile computer storage media. FIG. 11 illustrates, for example, mass storage 1124. Mass storage 1124 includes, but is not limited to, devices like a magnetic or optical disk drive, floppy disk drive, flash memory or memory stick. In addition, mass storage 1124 can include storage media separately or in combination with other storage media.

FIG. 11 provides software application(s) 1128 that act as an intermediary between users and/or other computers and the basic computer resources described in suitable operating environment 1110. Such software application(s) 1128 include one or both of system and application software. System software can include an operating system, which can be stored on mass storage 1124, that acts to control and allocate resources of the computer system 1112. Application software takes advantage of the management of resources by system software through program modules and data stored on either or both of system memory 1116 and mass storage 1124.

The computer 1112 also includes one or more interface components 1126 that are communicatively coupled to the bus 1118 and facilitate interaction with the computer 1112. By way of example, the interface component 1126 can be a port (e.g., serial, parallel, PCMCIA, USB, FireWire . . . ) or an interface card (e.g., sound, video, network . . . ) or the like. The interface component 1126 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 1112 to output device(s) via interface component 1126. Output devices can include displays (e.g. CRT, LCD, plasma . . . ), speakers, printers and other computers, among other things.

FIG. 12 is a schematic block diagram of a sample-computing environment 1200 with which the subject innovation can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). The servers 1230 can house threads to perform transformations by employing the aspects of the subject innovation, for example. One possible communication between a client 1210 and a server 1230 may be in the form of a data packet transmitted between two or more computer processes.

The system 1200 includes a communication framework 1250 that can be employed to facilitate communications between the client(s) 1210 and the server(s) 1230. The client(s) 1210 are operatively connected to one or more client data store(s) 1260 that can be employed to store information local to the client(s) 1210. Similarly, the server(s) 1230 are operatively connected to one or more server data store(s) 1240 that can be employed to store information local to the servers 1230. For example, programs can be designed on client(s) 1210 that interact with data housed by server(s) 1230 or more specifically server data store(s) 1240. Constructs can be created from schema associated with a remote database. Furthermore, maps can be created to facilitate interaction amongst client(s) 1210 and a server(s) 1230 to enable data to be accessed, updated, inserted and/or deleted over disparate data models across the communication framework 1250.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. A development system for facilitation the creation of object-oriented constructs from corresponding relational constructs from a relational database, the system comprising one or more computer processors and a plurality of components, each component comprising computer-executable instructions executing upon the one or more computer processors, the system comprising:

an interface component which provides a graphical user interface comprising a tool region, a workspace region and a data element region, the workspace region receiving a relational database construct from a representation of a relational database depicted in the data element region, the representation dragged from the data element region and dropped onto the workspace region;

a creation component that receives the relational database construct from the representation of the relational database, translates a schema corresponding to the relational database construct into an object-oriented programming language schema, and thereby creates a corresponding object-oriented construct from the relational database construct;

an alteration component which receives input from a user and alters attributes of the object-oriented construct created from the representation of the relational database construct dropped onto the workspace region base on the input from the user;

a map component that generates a map for an object-relational mapping between the relational database construct and the corresponding object-oriented construct, wherein the map facilitates interaction between the relational database construct and the corresponding object-oriented construct;

a construct definition component which creates definitions of the object-oriented construct such that the definitions are independent of any particular programming language; and a code generation component which generates code corresponding to the definitions of the object-oriented construct in a target programming language.

2. The system of claim 1, wherein the code generation component translates the object-oriented construct into the target programming language.

3. The system of claim 2, wherein the creation component generates an XML document that defines the object-oriented construct.

4. The system of claim 1, wherein generating the map for the objet-relational mapping comprises mapping data members of the object-oriented construct to table elements of the relational database.

5. The system of claim 1, further comprising a component that identifies an existing construct to the map component for the map generation.

6. The system of claim 1, wherein the object-oriented construct is a class.

7. The system of claim 1, wherein the relational database construct is one of a database, a database table, a stored procedure, a function and a database view.

8. The system of claim 1, further comprising a configuration component that singularizes a plural table name.

9. The system of claim 1, further comprising a component that displays the relational database construct or representation thereof.

10. The system of claim 9, further comprising at least one component that facilitates selection of the relation database construct and deposit upon the workspace region.

11. A computer-implemented method of program development for facilitation the creation of object-oriented constructs from corresponding relational constructs from a relational database, the method performed by computer-executable instructions executing upon one or more computer processors, the method, comprising:
   identifying a relational construct dragged from a data element region and deposited graphically upon a workspace region within a graphical user interface (UI), the relational database construct originating from a relational database schema;
   translating the relational database schema into an object-oriented programming language schema, thereby creating a corresponding object-oriented construct from the relational database construct;
   receiving input from a user and altering attributes of the object-oriented construct on the workspace region base on the input form the user;
   generating a map for an object-relational mapping between the relational database construct and the corresponding object-oriented construct, wherein the map facilitates interactions between the relational database construct and the corresponding object-oriented construct;
   creating definitions of the object-oriented construct such that the definitions are independent of any particular programming language; and
   generating code corresponding to the definitions of the object-oriented construct in a target programming language.

12. The method of claim 11, wherein generating the map for the object-relational mapping comprises mapping data members of the object-oriented construct to table elements of the relational database.

13. The method of claim 11, comprising generating a mapping between a database table and a class.

14. The method of claim 11, further comprising generating code for the object-oriented construct in the target language from the definition.

15. The method of claim 11, further comprising capturing an association between one or more existing object oriented constructs and the created object-oriented construct.

16. The method of claim 11, further comprising modifying the object-oriented construct in accordance with user specification.

17. The method of claim 11, comprising identifying a database table and creating a corresponding class including properties and methods.

18. The method of claim 17, further comprising singularizing a plural table name.

* * * * *